United States Patent
Flacks et al.

(10) Patent No.: US 6,708,267 B1
(45) Date of Patent: Mar. 16, 2004

(54) SYSTEM AND METHOD IN A PIPELINED PROCESSOR FOR GENERATING A SINGLE CYCLE PIPELINE STALL

(75) Inventors: Brian King Flacks, Georgetown, TX (US); Harm Peter Hofstee, Austin, TX (US); Osamu Takahashi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,088

(22) Filed: Feb. 4, 2000

(51) Int. Cl.[7] ............................................. G06F 9/30
(52) U.S. Cl. ............................................. 712/216
(58) Field of Search ............................... 712/216–219

(56) References Cited

U.S. PATENT DOCUMENTS

| | | | | |
|---|---|---|---|---|
| 4,750,112 A | * | 6/1988 | Jones et al. | 712/217 |
| 5,404,552 A | * | 4/1995 | Ikenaga | 712/216 |
| 5,509,130 A | | 4/1996 | Trauben et al. | |
| 5,699,536 A | | 12/1997 | Hopkins et al. | |
| 5,781,752 A | * | 7/1998 | Moshovos et al. | 712/216 |
| 5,812,812 A | * | 9/1998 | Afsar et al. | 712/216 |
| 5,870,580 A | * | 2/1999 | Walker | 712/218 |

FOREIGN PATENT DOCUMENTS

KR    0230552    11/1999

OTHER PUBLICATIONS

Patterson, David A. and John L. Hennessy; Computer architecture: a quantitative approach; 1995; Morgan Kaufman Publishers; 2nd edition; pp. 139–161.*

* cited by examiner

Primary Examiner—David Wiley
Assistant Examiner—Scott M. Collins
(74) Attorney, Agent, or Firm—Casimer K. Salys; Bracewell & Patterson, L.L.P.

(57) ABSTRACT

A pipelined processor and method are disclosed for speculatively determining dependencies. The processor processes a plurality of instructions in order. A speculative detection circuit which takes multiple clock cycles to operate determines whether a dependency exists. The speculative detection circuit inserts a single-cycle pipeline stall only in response to a determination that a speculative dependency exists.

11 Claims, 4 Drawing Sheets

Primary Register Queue — 204
- target(s) for inst. currently in X stage
- target(s) for inst. currently in C stage
- target(s) for inst. currently in W stage

Speculative Register Queue — 208
- target(s) for inst. currently in buffer IB0
- target(s) for inst. currently in X stage
- target(s) for inst. currently in C stage
- target(s) for inst. currently in W stage

*Fig. 3*

State Transistion Table

| State | Primary Hazard Signal | Second level Primary Hazard Sig. | Spec. Hazard Signal | Next State | Action |
|---|---|---|---|---|---|
| Run | 0 | X | 0 | Run | advance instruction buffers (shifts instructions) |
| Run | 1 | X | X | Run | Kill D & X stages Backup instruction buffers |
| Run | 0 | X | 1 | inst. buffers held | Kill D stage hold instruction buffers |
| inst. buffers held | 0 | 0 | X | Run | advance instruction buffers |
| inst. buffers held | 0 | 1 | X | inst. buffers held | Kill D stage hold instruction buffers |
| inst. buffers held | 1 | X | X | Run | Kill D & X stages Backup instruction buffers |

Fig. 4

SYSTEM AND METHOD IN A PIPELINED PROCESSOR FOR GENERATING A SINGLE CYCLE PIPELINE STALL

BACKGROUND OF THE INVENTION

1. Field of the Invention

The present invention relates in general to pipelined processors and, in particular, to a pipelined processor for generating a single cycle pipeline stall. Still more particularly, the present invention relates to a pipelined processor processing instructions in order to generate a single cycle pipeline stall in response to a detection of a dependency.

2. Description of the Related Art

A pipelined data processing system is a data processing system which includes a microprocessor architecture which is capable of executing multiple instructions per clock cycle. In order to execute multiple instructions per cycle, multiple independent functional units that can execute concurrently are required. In an in-order pipelined processor, these multiple instructions are executed in their original sequence.

Some of the instructions are single cycle instructions which complete their processing in a single clock cycle. Others instructions require more than one clock cycle to complete processing.

Dependencies often occur during instruction processing. One type of dependency occurs when one register writes a value to a register which must be read by another, later instruction. When the instruction writing a value to a register takes more than one cycle to execute, the later instruction which reads that value stored in the register must be stalled until the first instruction completes its execution. Therefore, pipeline stalls must be inserted into the instruction stream in order to properly execute the instructions.

In known systems, a determination regarding whether to insert a pipeline stall due to a dependency must be made in a single cycle, if a single-cycle stall is to be generated.

Mechanisms that use multiple cycles to determine if an instruction can be dispatched or must be stalled cause multiple-cycle stalls. Taking multiple cycles to determine stall conditions is advantageous for improving processor frequency, but multiple stall cycles are disadvantageous for processor performance as measured in cycles per instruction (CPI).

Therefore a need exists for a pipelined processor processing instructions in order for generating a single cycle pipeline stall in response to a detection of a dependency, where the detection mechanism takes multiple cycles to control instruction dispatch.

SUMMARY OF THE INVENTION

A pipelined processor and method are disclosed for speculatively determining dependencies. The processor processes a plurality of instructions in order. A speculative detection circuit which takes multiple clock cycles to operate determines whether a dependency exists. The speculative detection circuit inserts a single-cycle pipeline stall only in response to a determination that a speculative dependency exists.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 3 illustrates a primary register address queue and a speculative register address queue in a computer system in accordance with the method and system of the present invention; and FIG. 4 depicts state transition table describing the operation of the processor in accordance with the method and system of the present invention.

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

A pipelined processor and method are disclosed for speculatively determining dependencies. The dependencies include data dependencies and structural dependencies. The processor is capable of processing a plurality of instructions in order. A speculative determination is made regarding whether a dependency exists. A single-cycle pipeline stall is generated only in response to a determination that a speculative dependency exists.

A primary hazard detection circuit and primary register address queue are included to determine whether actual dependency hazards exist. In addition, a speculative hazard detection circuit and speculative register address queue are included to determine whether speculative dependency hazards exist. If a speculative hazard exists, the pipe is stalled for only one cycle by inserting a single NOP instruction into the pipe.

The disclosed invention is capable of inserting only a single-cycle stall because the dependency detection is completed in a speculative manner. Therefore, a dependency hazard is detected prior to the instruction causing the hazard being dispatched.

Figure 1:
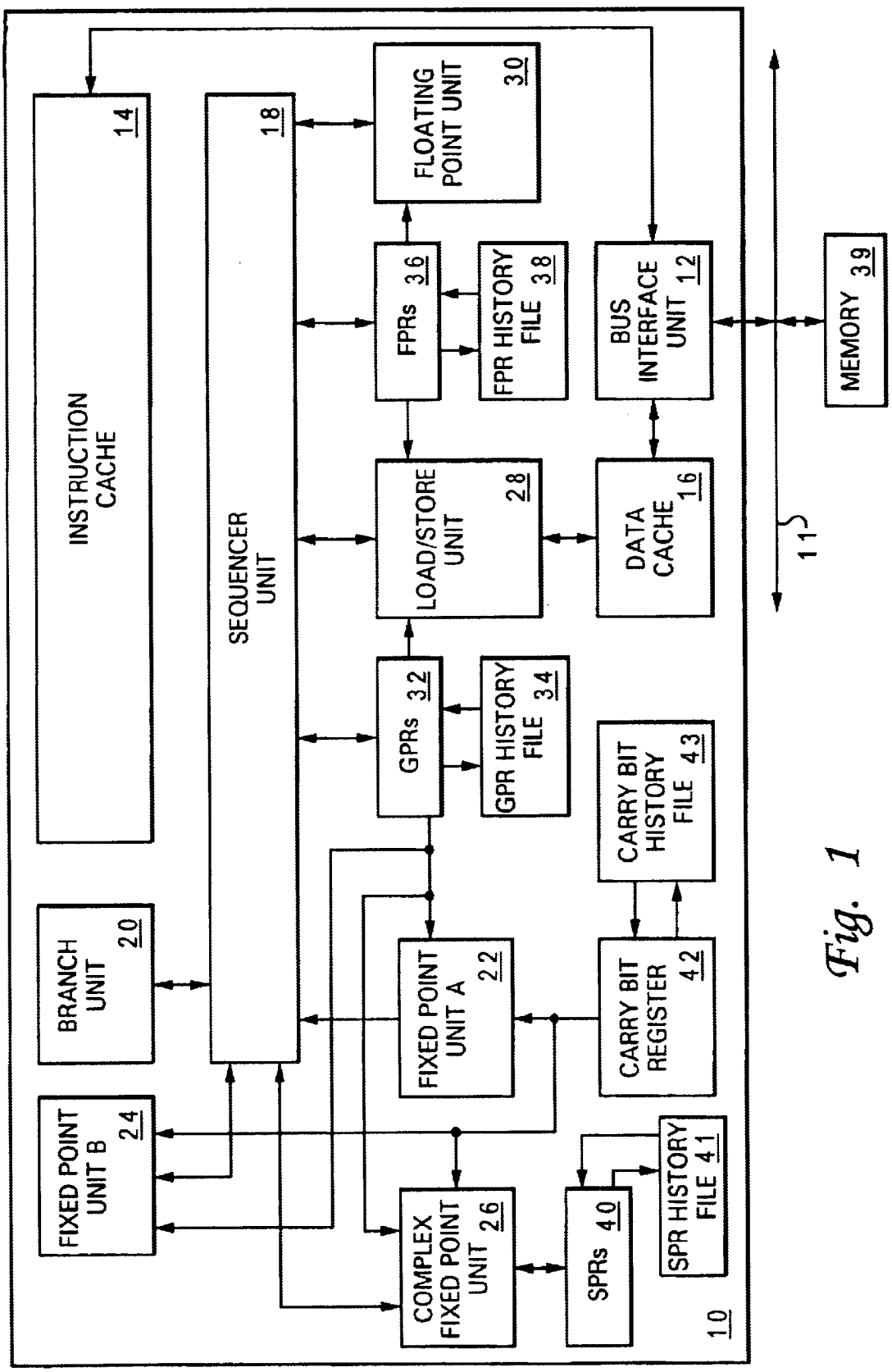
FIG. 1 illustrates a pictorial representation of a pipelined processor with in-order dispatch in accordance with the method and system of the present invention.

FIG. 1 is a block diagram of a processor 10 system for processing information according to the preferred embodiment. In the preferred embodiment, processor 10 is a single integrated circuit microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs"). In a preferred embodiment, the general purpose register may "forward" (or "bypass") results from other execution units without first storing them in registers.

Moreover, FXUA 22 and FXUB 24 input a "carry bit" from a carry bit ("CA") register 42. FXUA 22, FXUB 24, CFXU 26 and LSU 28 output results (destination operand information) of their operations for storage to GPRs 32. Also, CFXU 26 inputs and outputs source operand information and destination operand information to and from special purpose registers ("SPRs") 40.

FPU 30 inputs its source operand information from floating point architectural registers ("FPRs") 36. In a preferred embodiment, the floating point architectural registers may "forward" (or "bypass") results from other execution units without first storing them in registers.

FPU 30 outputs results (destination operand information) of its operation for storage to FPR 36.

In response to a Load instruction, LSU 28 inputs information from data cache 16 and copies such information to GPR 32. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the preferred embodiment, an instruction is normally processed as five stages, namely fetch, dispatch, execute, writeback, and completion.

In the fetch stage, sequencer unit 18 selectively inputs (from instructions cache 14) one or more instructions from one or more memory addresses storing the sequence of instructions discussed further herein above in connection with branch unit 20 and sequencer unit 18.

In the dispatch/decode/issue stage, sequencer unit 18 decodes and dispatches the first instruction one of execution units 20, 22, 24, 26, 28, and 30. In the dispatch stage, operand information is supplied to the selected execution units for dispatched instructions. Processor 10 dispatches instructions in order of their programmed sequence.

Each register has an associated history file in which the old contents of the register is stored. The history files may be utilized to restore previous contents to the registers when a reset of the processor occurs following a fault or exception condition, as is known to those skilled in the art. Thus, FIG. 1 includes SPR history file 41, carry bit history file 43, GPR history file 34, and FPR history file 38.

In the writeback stage, the output results from the different units are written to the appropriate registers. Because different instructions may require a different number of cycles to produce their results, writeback may occur "out of order" with respect to the programed instruction sequence.

The sequencer unit 18 accumulates information from the various execution units and determines if instructions have finished without exception conditions. If all instructions prior to and including the current instruction have "finished" without exception conditions, the prior architectural values of the registers overwritten by the current instruction need no longer be stored in the history files, and the instruction has "completed". Processor 10 thus "completes" instructions in order of their programmed sequence. If an exception condition does occur, the sequencing unit directs the GPRs to restore architected values prior to the instruction causing the exception. The sequencing unit "refetches" instructions from the next valid instruction address.

Figure 2:
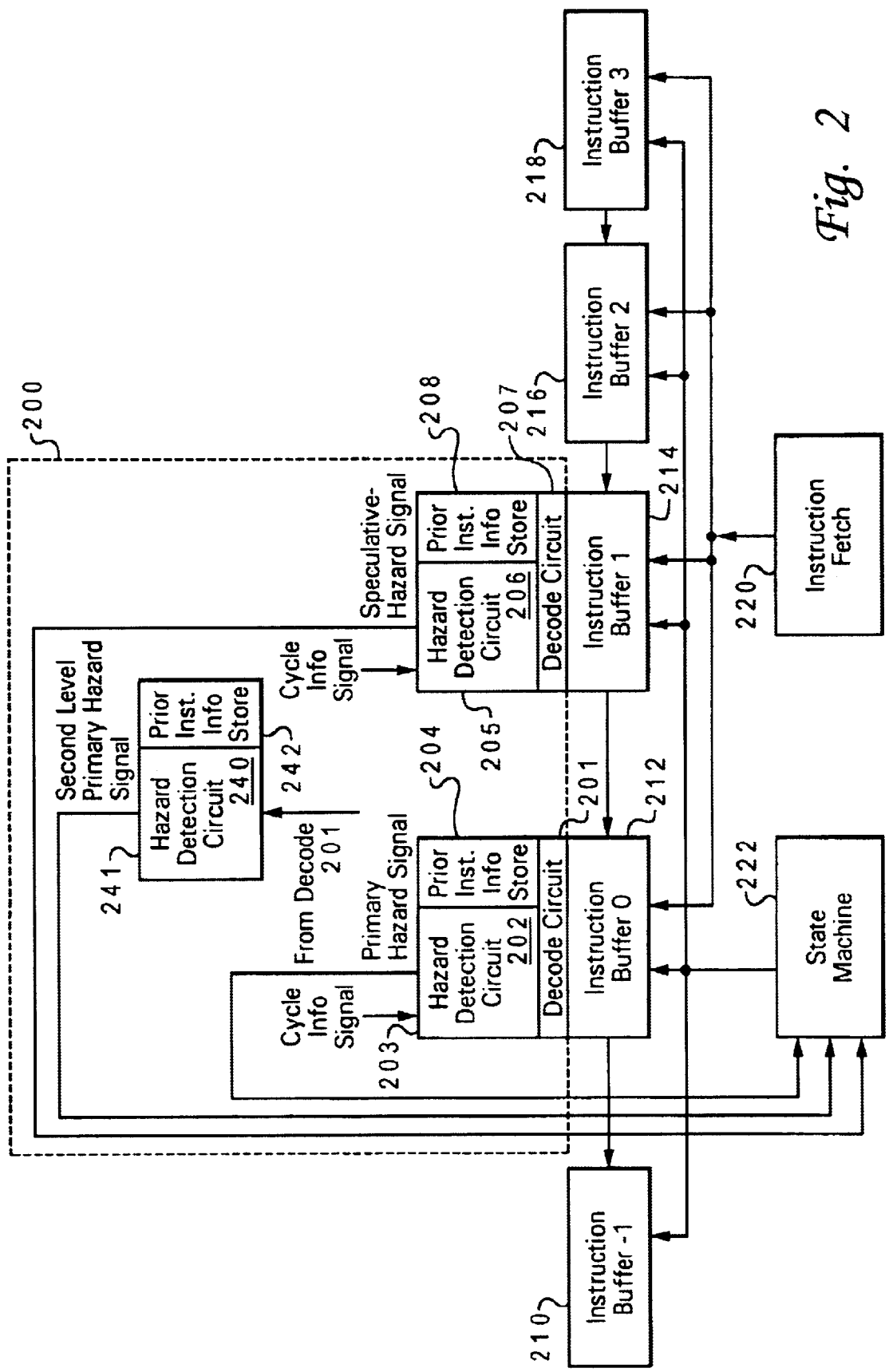
FIG. 2 depicts a more detailed pictorial representation of a stall generation circuit included within the sequencer unit of FIG. 1 in accordance with the method and system of the present invention.

FIG. 2 depicts a more detailed pictorial representation of a stall generation circuit included within the sequencer unit of FIG. 1 in accordance with the method and system of the present invention. The stall generation circuit 200 includes a primary detection circuit 203 which includes a primary hazard detection circuit 202 and a primary register address queue 204, and a speculative detection circuit 205 which includes a speculative hazard detection circuit 206 and a speculative register address queue 208. Primary hazard detection circuit 202 and primary register address queue 204 are utilized to generate a primary hazard signal when an actual hazard exists due to a dependency. The detected dependency may be either a data or structural resource dependency. Speculative hazard detection circuit 206 and speculative register address queue 208 are utilized to generate a speculative hazard signal when a speculative hazard exists due to a dependency. Again, the detected dependency may be either a data or structural dependency.

Instruction buffers 210, 212, 214, 216, and 218 are included for storing instructions. Buffer 212 is a dispatch buffer utilized to store the next instruction to be dispatched/issued. Buffers 214, 216, and 218 store speculative instructions. The instructions stored in these buffers are the instructions which were fetched by instruction fetch unit 220 in sequential order along with the instruction in buffer 212 from the cache line. An instruction buffer 210 is included which contains the most recently dispatched instruction.

Instructions are issued to a function unit from instruction buffer 212. Instruction buffers 214, 216, and 218 represent the next sequential instructions following the instruction in buffer 212. In every cycle, state machine 222 controls the instruction buffers to either shift upwards in the figure to load the next sequential set of instructions, load a new set of instructions from an instruction cache (not shown), or hold the issue queue. The issue queue must be held if there is a resource conflict between the instruction in instruction buffer 212 and instructions that have been issued previously, but have not finished and still occupy resources in the machine.

Dependency detection circuit 200 includes a decode circuit 201, prior instruction information store 204 and hazard detection circuit 202. Decode circuit 201 receives the instruction currently being issued from instruction dispatch buffer 212, as well as an "issue valid" signal from state machine 222. Decode circuit 201 provides prior instruction information store 204 and hazard detection circuit 202 with decoded information indicating which resources the instruction uses, such as target register addresses and structural resources such as function units or busses. Decode circuit 201 also supplies information indicating the instruction pipeline stages in which the resources are required.

Prior instruction information store 204 updates the information on which resources are in use by prior instructions in response to the information regarding the newly issued instruction from decode circuit 201, the "issue valid" signal from state machine 222, and instruction progress signals from the function units. In an in-order pipelined machine without pipeline holds, prior instruction information store 204 may be efficiently implemented as a series of queues for target address registers, and shift registers to maintain "one-hot" information indicating the pipeline stages in which registers or structural resources are in use.

Hazard detection circuit 202 determines if a resource conflict exists between the instruction in instruction buffer 212 and the instruction in flight (the resources of which are maintained by store 204). The circuit 202 includes an array of comparators for comparing source operand register addresses from instruction buffer 212 to the targets of instructions in flight. In addition, hazard detection circuit 202 contains logic to determine if any of the structural resources are required in a cycle in which they are or will be in use by both the instructions in flight and the instruction in buffer 212.

If an operand dependency hazard or structural hazard exists, the hazard signal is asserted, and state machine 222 must de-assert the "issue valid" signal, and hold the instruction in the instruction buffers while the prior instruction information store 204 is updated in response to "cycle information" signals from the function units indicating instruction progress.

At each cycle, the instructions are shifted from one buffer to the next. For example, the instruction currently located in buffer 218 will be shifted to buffer 216 during the next clock cycle as long as the prior instructions continue to be executed in sequential order. If an exception occurs or a branch instruction is executed, instruction fetch 220 will fetch new instructions which will be stored in these instruction buffers.

A state machine 222 is included which receives the primary hazard signal and the speculative hazard signal as two of its inputs. State machine 222 is utilized to control the dispatch of instructions and the shifting of instructions from one instruction buffer to the next buffer.

Speculative prior instruction information store 208 includes the addresses of the target registers for the instructions currently in flight and including the instruction stored in instruction buffer 212. Primary prior instruction information store 204 includes the addresses of the target registers for the instructions currently in flight. The instructions in flight are those instructions which have been dispatched but which have not yet reached the completion stage.

A third detection circuit 241 is also included. Third detection circuit 241 includes a hazard detection circuit 240 and a prior instruction information store 242. Third detection circuit 241 is coupled to instruction buffer 212 and receives the same signals the detection circuit 203 receives. Third detection circuit 241 operates in a manner similar to primary detection circuit 203, except that instead of operating at the dispatch stage (D stage) as circuit 203 operates, circuit 241 operates at the execution stage (X stage). Therefore, prior instruction information store 242 includes targets for instructions in the C and W stages of the pipe. Third detection circuit generates a second-level primary hazard signal when a dependency is detected.

FIG. 3 illustrates a primary register address queue and a speculative register address queue in a computer system in accordance with the method and system of the present invention. Speculative register address queue holds the targets for the instructions currently in flight and the targets for the instruction currently being dispatched. Therefore, speculative register address queue within 208 holds the targets for the instruction currently in the D stage, i.e. the dispatch stage which is the instruction currently in buffer 212, the X stage which follows the D stage and which is a first part of the execution stage, the C stage which follows the X stage and which is a second part of the execution stage, and the W stage which follows the C stage and which is the write-back stage. Primary register address queue 204 holds the targets for the instruction currently in the X stage, the C stage, and the W stage.

Those skilled in the art will recognize that the register address queues must be deep enough to hold all instructions currently in flight that may still occupy resources or produce results.

As the instructions are shifted from one instruction buffer to the next, the entries in each register address queue are also shifted.

The hazard detection circuits 202 and 206 utilize a cycle information signal also with their associated register address queues to determine whether a hazard exists. A hazard exists when a hazard detection circuit determines that the targets in the instruction buffer associated with the hazard detection circuit match one of the targets in the associated register address queue, and where that instruction will not complete executing in time. The hazard detection circuit utilizes the cycle information signal to determine whether the instructions in flight will complete execution in time for the registers to hold valid values-for the instruction in the associated instruction buffer.

FIG. 4 depicts state transition table describing the operation of the processor in accordance with the method and system of the present invention. The state transition table describes the operation of the processor in response to whether or not the various hazard signals are currently asserted.

Specifically, whereas the mechanism has been described here to govern instruction issue in a scalar processor, the same mechanism may be used to issue instructions from issue queues associated with multiple function units in a superscalar microprocessor.

While a preferred embodiment has been particularly shown and described, it will be understood by those skilled in the art that various changes in form and detail may be made therein without departing from the spirit and scope of the present invention.

What is claimed is:

1. A method in a pipelined processor including a speculative detection circuit designed for in-order processing, said processor processing a plurality of instructions in order, said method comprising the steps of:

establishing a first dependency hazard detection circuit coupled to a speculative instruction buffer for determining whether a speculative dependency exists;

speculatively determining whether a dependency exists among instructions being dispatched and executed in-order, said speculative determining utilizing multiple clock cycles;

asserting a speculative hazard signal in response to a determination that said speculative dependency exists;

generating via said speculative detection circuit only a single-clock-cycle pipeline stall in response to a determination that said speculative dependency exists inserting a single-clock-cycle pipeline stall in response to an assertion of said speculative hazard signal;

establishing a second dependency hazard detection circuit coupled to said speculative instruction buffer for determining whether an actual dependency exists;

asserting a primary hazard signal in response to a determination that said actual dependency exists; and inserting a multiple-clock-cycle pipeline stall in response to an assertion of said primary hazard signal when said speculative hazard signal is not asserted.

2. A single pipelined processor, said processor dispatching and executing a plurality of instructions in order, said single pipelined processor comprising:

a speculative detection circuit taking multiple clock cycles to implement instruction buffer controls, said speculative detection circuit including a speculative decode circuit, a speculative prior instruction information store and a speculative hazard detection circuit for inserting a single-clock-cycle pipeline stall in response to a detection of a speculative dependency; and a primary detection circuit taking multiple clock cycles to implement instruction buffer controls, said primary detection operating concurrently with said speculative detection circuit and including a primary decode circuit, a primary prior instruction information store and a primary hazard detection circuit for inserting a multiple-clock-cycle pipeline stall in response to a detection of an actual dependency.

3. The processor of claim 2, further comprising:

said speculative detection circuit generating a speculative hazard signal in response to a determination that a speculative hazard exists.

4. The processor of claim 2, further comprising:

said speculative prior instruction information store for storing resources in use by instructions currently in flight and for an instruction stored in an instruction dispatch buffer; and said speculative hazard detection circuit for comparing resources required for a speculative instruction resources in use in said speculative prior instruction information store, said speculative instruction being an instruction which was fetched next in sequential order after said instruction stored in said dispatch buffer.

5. The processor of claim 4, further comprising:

said speculative detection circuit asserting a speculative hazard signal in response to a detection of a speculative hazard.

6. The processor of claim 4, further comprising:

said primary detection circuit asserting a primary hazard signal in response to a detection of an actual hazard.

7. The processor of claim 6, further comprising:

said speculative detection circuit asserting said speculative hazard signal prior to said speculative instruction causing said speculative hazard being stored in said dispatch buffer.

8. The processor of claim 2, further comprising:

a state machine that receives inputs a signal from at least one of said primary detection circuit and said speculative detection circuit and which includes logic for determining when to assert a pipeline stall result from among no pipeline stall, a single clock-cycle pipeline stall, and multiple clock-cycle pipeline stalls based on said received inputs; and wherein said state machine comprises an output means for signaling said pipeline stall result and effecting an implementation of said pipeline stall result.

9. The processor of claim 8, wherein both said speculative detection circuit and said primary detection circuit further include an output signal that is transmitted to said state machine.

10. The processor of claim 9, wherein said speculative detection circuit provides a first input signal to said state machine and said primary detection circuit provides a second input signal to said state machine.

11. The processor of claim 2, wherein said speculative detection circuit buffers instructions in at least one additional instruction buffering stage than said primary detection circuit.

* * * * *